Patented Nov. 15, 1927.

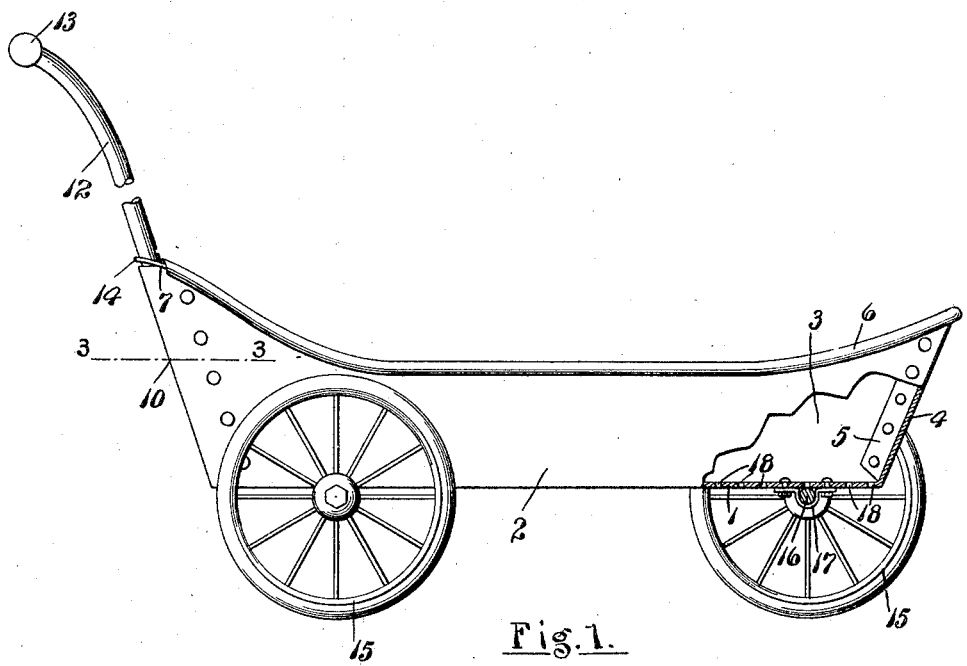
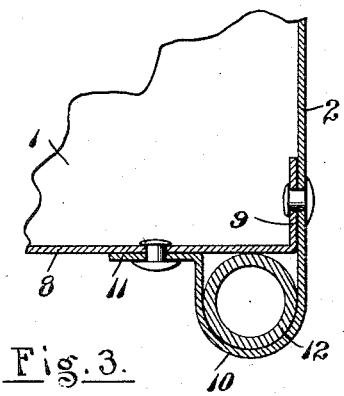
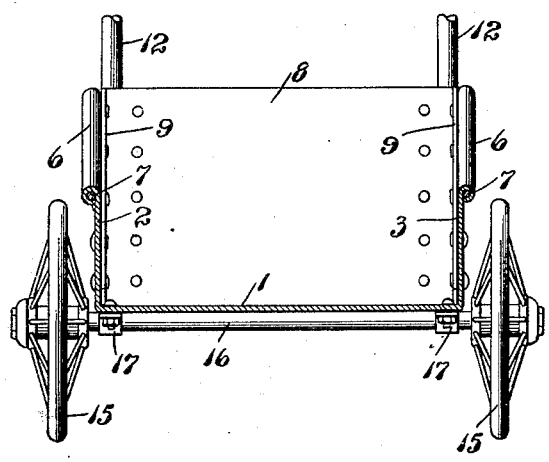
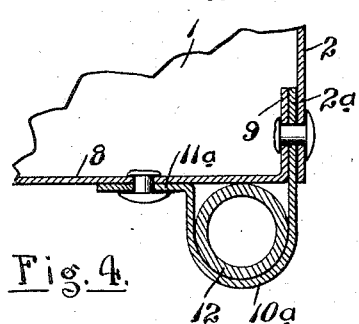

1,649,176

UNITED STATES PATENT OFFICE.

PETER MOSIER, OF GRAND RAPIDS, MICHIGAN.

CART.

Application filed January 3, 1927. Serial No. 158,500.

This invention relates to a cart, and is particularly concerned with a very simple and economical construction of push cart which can be made at very low cost of manufacture, and with which the handles for pushing the same may be adjusted to different heights, and the axles carrying the wheels on which the cart body is mounted may be adjusted to different positions in the length of the body by means of very simple and effective construction. To these ends I have made the invention, the preferred form of which is described in the following description and illustrated in the accompanying drawings, in which, Fig. 1 is a side elevation of the cart, portions being broken away and shown in section, for disclosure of the means of adjusting the wheel axles to different positions.

Fig. 2 is a transverse vertical section through the cart, looking to the rear.

Fig. 3 is a fragmentary enlarged horizontal section, substantially on the plane of line 3—3 of Fig. 1, and Fig. 4 is a section similar to that shown in Fig. 3, illustrating a slightly different form of construction at the rear corners of the cart body.

Like reference characters refer to like parts in the different figures of the drawings.

The body of the cart is made of sheet metal and includes a horizontal bottom 1, from which vertical sides 2 and 3 extend upwardly with an upwardly and forwardly inclined end 4 at the front of the body. The end 4, at its edges, has flanges 5 turned back so as to lie against the inner sides of the sides 2 and 3 to which the flanges are secured permanently by rivets, spot welding or in any other equivalent manner. The upper edges of the sides 2 and 3 and of the front end 4 are formed with a bead 6 for purposes of reinforcement and, preferably, though not necessarily, a continuous wire or rod 7 extends through the different beads from the rear end of one bead 6 at one side of the cart, thence through the bead at the upper edge of the end 4, and back through the bead 6 at the opposite side of the cart.

The body is completed by a back 8 which is turned upwardly and to the rear from the rear end of the bottom 1 and is provided with forwardly turned flanges 9 at its side edges which, like the flanges 5 come inside of the sides 2 and 3 of the body and lie against the same, being permanently secured to the body in the same manner as the flanges 5. The body accordingly is formed from a single plate of sheet metal.

In the construction shown in Figs. 1 and 3, the sides 2 and 3 at their rear edges are extended back of the back 8 and then curved inwardly and back toward said back 8, as indicated at 10, terminating in flanges 11 which lie against the rear side of the back 8 and are permanently secured thereto by rivets, spot welding or the like. This makes a pair of sockets, one at each rear corner of the body, for the reception of the lower end portions of handles 12 which may be forced downwardly into said sockets any desired distance. The upper ends of the two handles 12 are connected by a cross bar 13 in the usual manner. This construction permits adjustment of the handles so as to bring the cross bar 13 to a desired height to conform to the height of the one who is using the cart.

Instead of the construction shown in Fig. 3, an equivalent construction like that shown in Fig. 4 may be used to provide the sockets for the lower ends of the handles 12. In this construction, instead of the sides 2 and 3 being extended and formed into sockets the sides terminate at their rear edges flush with the plane of the rear side of the back 8. A separate piece of sheet metal is used to make each socket, comprising a section 2ª which lies between its adjacent side 2 or 3 and a flange 9, thence extending back of the back 8 and being formed into a socket 10ª with an attached flange 11ª similar in all respects to the socket 10 and the flange 11 shown in Fig. 3. The ends of the wire or rod 7 where they pass from the rear ends of the beads 6 are formed into hooks 14 which pass around the handles 12 strengthening and reinforcing the same.

The cart body is mounted on front and rear pairs of wheels 15 each pair being mounted at the outer ends of transverse axles 16. The axles lie underneath the bottom 1 and in direct contact therewith. They are attached to said bottom by sheet metal clips 17 through the ends of which small bolts pass, these bolts also extending through openings 18 in the bottom 1 of the body. The openings 18, as shown in Fig. 1, are spaced equal distances apart and there are a large number of said openings so as to permit attachment of the clips 17 at various positions in the length of the body. The same construction shown at the forward end of Fig. 1, is used for the adjustable connection of the rear axle 16.

This construction of push cart is very economical, strong, durable and efficient. The body is made from a single plate of sheet metal. The sockets for receiving the lower end portions of the handles 12 may be formed integral with the sides of the body or may be separate sheet metal members as shown in Fig. 4. The adjustment of the axles to different positions on the lower side of the bottom is a very simple and economical construction and one which is of value in many instances. The invention is defined in the appended claims and is to be considered comprehensive of all forms of structure coming within their scope.

I claim:

1. A cart comprising a body formed from a plate of sheet metal having a bottom, spaced apart sides and ends, each side at its rear portion being extended beyond the rear end of the body and formed into a socket open at its upper end, and handles inserted at their lower end portions in said sockets and adjustable lengthwise thereof.

2. A cart comprising a body having a bottom, sides and ends of sheet metal, said sides and front end of the body at their upper edges being formed with a bead, a continuous wire or rod passing through the beads, the ends of the wire extending beyond the rear ends of the beads of said sides of the body, sockets at the rear corners of the body, handles inserted in said sockets, and hooks formed at the rear ends of said wire connecting with and passing back of the handles.

3. A cart comprising a body of sheet metal including a bottom, sides and ends, said bottom adjacent each side edge thereof and near its front and rear ends having a plurality of equally spaced openings therethrough, front and rear axles located directly underneath and transversely of the bottom of said body, clips located under said axles and bolts passing through said clips and through openings in the bottom of the body, said clips being adjustable to different positions to correspond with different openings, and wheels mounted at the ends of the axles.

In testimony whereof I affix my signature.

PETER MOSIER.